Feb. 28, 1933.  A. HANAK  1,899,031
APPARATUS FOR SEPARATING METALS OR ALLOYS
Filed April 11, 1930   2 Sheets-Sheet 2

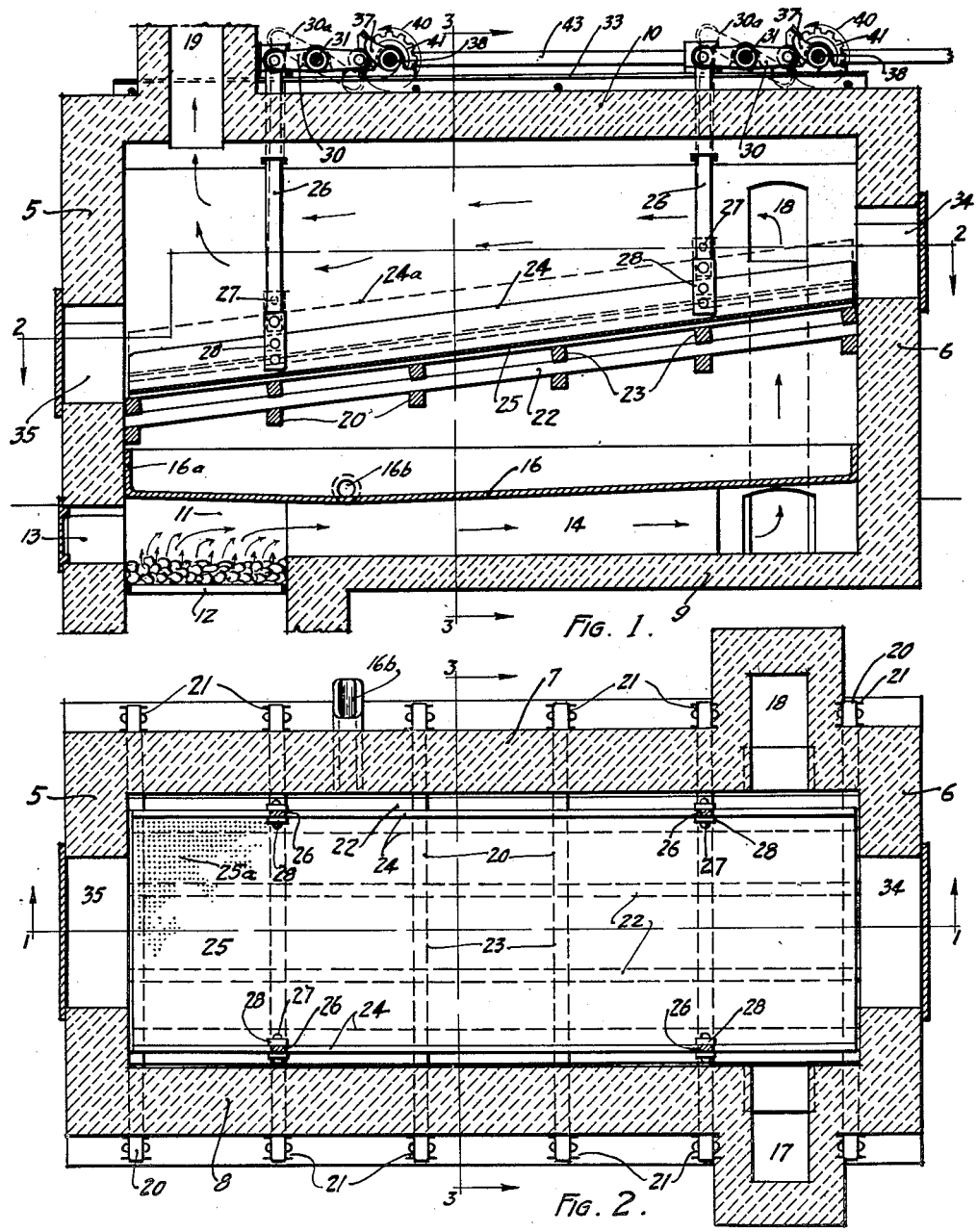

INVENTOR:
Albert Hanak

Patented Feb. 28, 1933

1,899,031

UNITED STATES PATENT OFFICE

ALBERT HANAK, OF PHILADELPHIA, PENNSYLVANIA, ASSIGNOR TO GIRARD SMELTING & REFINING COMPANY, OF PHILADELPHIA, PENNSYLVANIA

APPARATUS FOR SEPARATING METALS OR ALLOYS

Application filed April 11, 1930. Serial No. 443,414.

My present invention relates to the art of melting various articles composed of metals of varying melting points and particularly during the process of waste recovery.

The object of the invention is to provide a suitable apparatus wherein material containing a combination of metals or alloys of differing melting points may be processed continuously resulting in a separation of the lower from the higher melting metals.

In carrying out my invention, I provide a specially constructed furnace having a treatment chamber wherein materials may be heated to a temperature intermediate to the melting points of the constituent metals to be separated; means for generating said heat and circulating same through the furnace and melting the low point metals; mechanism for imparting to said material lateral motion for collecting the solid high melting metals into one channel and vertical impact for shaking the molten low melting metal free and collecting it into another channel, all as will be hereinafter more fully described.

In the drawings

Figure 1 shows a longitudinal vertical section through the apparatus taken on line 1—1 of Figures 2, 3 and 4, looking in the direction of the arrows.

Figure 2 is a plan view of the apparatus taken on line 2—2 of Figures 1 and 3 looking in the direction of the arrows.

Figure 3:
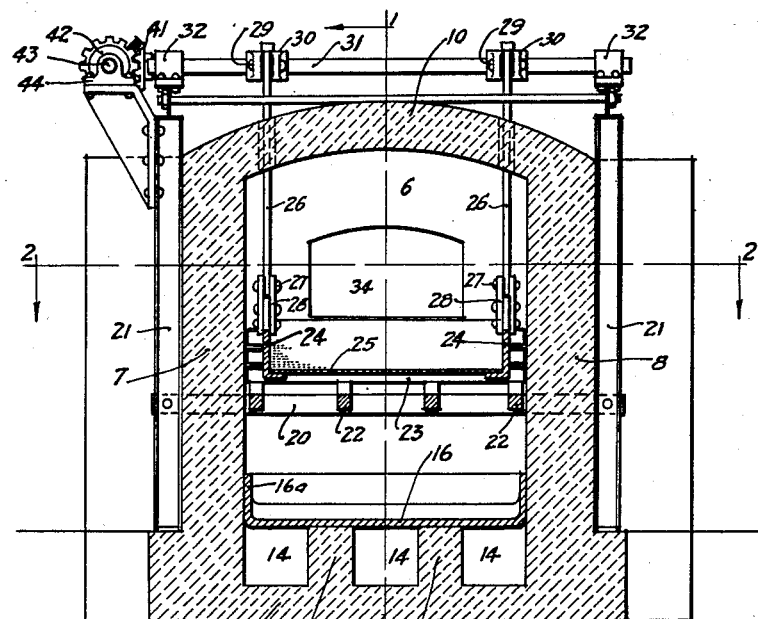
Figure 3 is a cross section of the apparatus taken on line 3—3 of Figures 1, 2 and 4 looking in the direction of the arrows.
Figure 4:
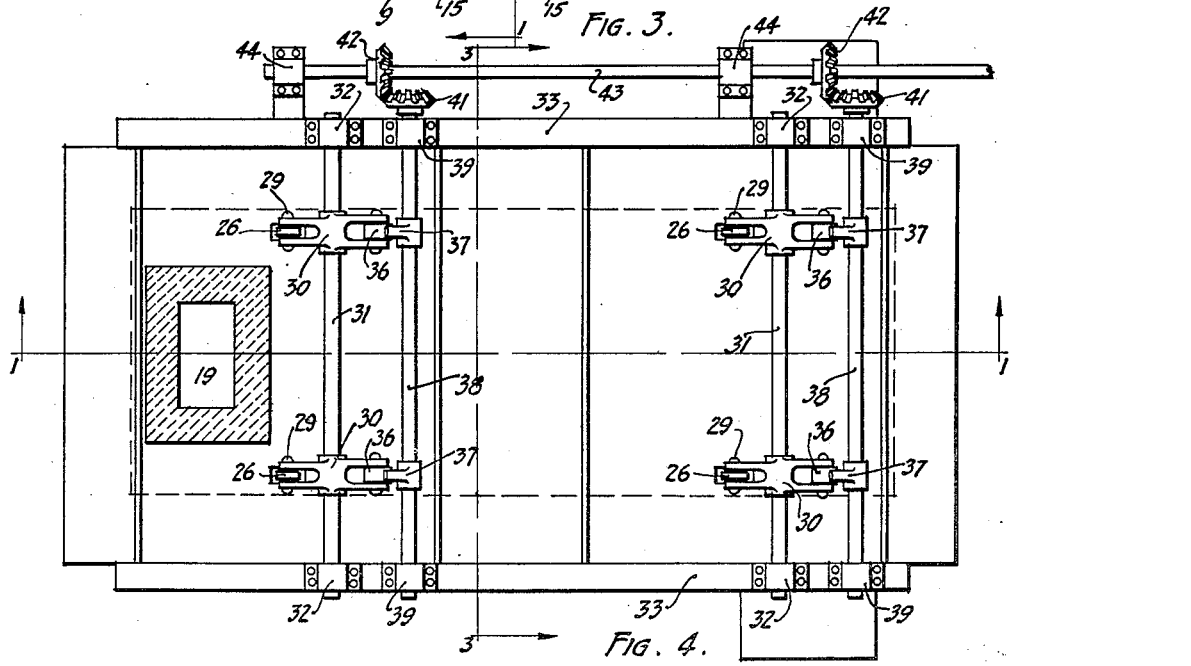
Figure 4 is a top view of the apparatus.

As disclosed by the drawings the apparatus consists of a furnace built of refractory materials having a front wall 5, rear wall 6, two side walls 7 and 8, bottom 9, and an arched roof 10.

The heat for the furnace is developed in the fire box 11, which for the present purpose of illustration is generated by coal resting on grate 12. This fire box is charged through opening 13. The gases of combustion are carried in the direction of the arrows through the chambers 14 (Figure 3) which are formed by the side walls of the furnace and the partitions 15, and by a metal pan 16 of such dimensions as to fit snugly within the plan area of the furnace.

These gases after passing through the horizontal ducts 14, towards the rear of the furnace are carried through vertical ducts 17 and 18 into the upper part or treatment chamber of the furnace and then out to the stack breaching 19.

The purpose of this arrangement is to cause the combustion gases to keep the low melting metals collected in pan 16, in a liquid state while the heat circulates through the treatment chamber of the furnace and liquifies the low melting metals contained in the processed material.

Within the treatment chamber are placed supporting cross bars 20, of iron or similar material passing through the side walls of the furnace and bolted to buck stays 21, that brace the said furnace.

Upon these cross bars are placed a second layer of longitudinal bars 22, which in turn support a third set of cross bars 23 forming impact grates. The entire assembly is set at a suitable angle or slope for the purpose hereinafter explained.

Upon this assembly of grate bars rests a shaker tray formed of side angle supports 24, and a foraminated bottom plate 25, secured thereto.

This foraminated shaker tray is supported by vertical hangers 26, through bearing pins 27, and supporting harness 28, secured to the sides of the shaker tray.

These hangers 26, pass through the roof of the furnace and are carried through the bearing pins 29, by rocker arms 30; the rocker arms being supported by cross shafts 31, resting in bearings 32; said bearings being fastened to structural frame 33 properly secured on top of the buck stays 21 at the sides of the furnace.

This arrangement of the shaker tray suspension permits its vertical movement and when it reaches the upper level, shown by dotted lines at 24a, and 30a, it is released and allowed to drop with force and strike the impact grate bars 23.

The resulting impact frees the molten low melting metals from the solid high melting metals and forces same through the foraminations of the shaker tray, simultaneously inducing a progression of the solid metals down the sloping shaker tray from the charging door 34 to the discharge door 35, constantly in the path of the heating gases.

The molten metal when released from the shaker tray drops and is collected in the pan 16, having side 16a and a spout 16b to which the bottom is sloped.

The apparatus for actuating the vertical movement of the shaker tray consists of the rocker arms 30, rotating around the shaft 31, supporting at one end of the rocker arm the vertical tray suspender 26, and at the opposite end a roller 36.

A sufficient number of such suspension points are provided to properly carry the load; in the present instance I show four such points.

The rocker arms 30, are actuated by the cams 37, secured to the cross shaft 38, supported by the bearings 39.

The cross shafts 38, are provided at one end with the bevel gears 41 which mesh with the bevel gears 42.

The bevel gears 42 are secured to a driving shaft 43, supported by bearings 44, and motivated by suitable power mechanism, not shown herein.

The shafts 38, and wiper cams 37, rotating in the direction of the arrow 40, (Figure 1) engage the rollers 36, imparting to them a downward movement which through the lever action of the rocker arms 30, lifts the shaker tray to the position shown at 24a.

When the cams become disengaged from the following rollers 36, it permits the shaker tray to drop on the impact grate bars 23.

To more clearly illustrate the operation of this apparatus I will describe the treatment of automobile radiators which are built of sections of brass, iron or copper etc. soldered together to form a cellular structure.

These radiators are introduced into the treatment chamber through the door 34 and placed upon the moving shaker tray and in the path of the heating gases which are regulated to melt the solder.

During their progression down the sloping tray, they are rid of all the solder which is melted by the heat and shaken off the tray into the collecting pan 16.

By the time the treated material has progressed to the discharge door 35, it is free of solder and the solid parts of brass, iron or copper are removed from the treatment chamber.

The application of this apparatus is by no means limited to the treatment of radiators nor is the heating arrangement limited to the arrangement shown, since it is possible to generate the heat by the combustion of oil or gases as well as coal and it is further possible to pass the gases of combustion first through the treatment chamber and then under the pan 16, or to provide a plurality of combustion chambers each serving the various sections of the furnace, all without departing from the scope of my invention.

Having thus described the apparatus and process, I do not wish to be restricted to the exact details of construction or sections shown or described for as has been indicated it is obvious that the combination of a furnace with specifically different means therein for retaining in solid form the high melting metals; heating means for liquifying the low melting metal; means for separating the low from the high melting metals, and means for collecting the low melting metals in a suitable receptacle as herein set forth may come within the purpose and scope of my invention.

Having thus described my invention, what I claim and desire to secure by Letters Patent is:

In an apparatus for separating lower melting from higher melting metals or alloys, the combination of a furnace of refractory material; means for heating all parts of said furnace; means for suspending within the furnace a sloped foraminated shaker tray; mechanism actuating the suspension members for vigorously shaking this tray in a vertical direction to induce lateral progression of treated material through the furnace; impact grating located below the shaker tray to induce, by said impact between grating and shaker tray, the separation of the fused low melting metals from the solid higher melting ones and a collecting pan below the impact grating for collecting the said low melting metals.

ALBERT HANAK.